(12) United States Patent
Baumert et al.

(10) Patent No.: US 6,244,645 B1
(45) Date of Patent: Jun. 12, 2001

(54) PASSENGER-CARRYING OR ESTATE-TYPE MOTOR CAR

(75) Inventors: Heinz Baumert, Sindelfingen; Ferdinand Greiner, Wildberg; Josef Wamhoff, Nufringen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/499,443

(22) Filed: Feb. 7, 2000

(30) Foreign Application Priority Data

Feb. 5, 1999 (DE) .............................................. 199 04 714

(51) Int. Cl.⁷ ...................................................... B60P 9/00
(52) U.S. Cl. .................. 296/24.1; 296/65.05; 296/65.09; 296/65.16; 414/507
(58) Field of Search ............................... 296/24.1, 65.09, 296/65.05, 65.16; 414/507, 508

(56) References Cited

U.S. PATENT DOCUMENTS

| | | | |
|---|---|---|---|
| 657,639 | * 9/1900 | Brestle | 414/528 |
| 3,025,982 | * 3/1962 | Quint | 414/528 |
| 4,339,224 | * 7/1982 | Lamb | 414/507 |

FOREIGN PATENT DOCUMENTS

| | | |
|---|---|---|
| 69 269 | 5/1969 | (DE) . |
| 34 135 | 10/1985 | (DE) . |
| 39 30 626 | 3/1991 | (DE) . |
| 198 02 077 | 8/1998 | (DE) . |
| 197 09 114 | 9/1998 | (DE) . |
| 0 173 936 | 3/1986 | (EP) . |
| 814714 | 6/1959 | (GB) . |

* cited by examiner

*Primary Examiner*—D Glenn Dayoan
*Assistant Examiner*—Lori L. Coletta
(74) *Attorney, Agent, or Firm*—Evenson, McKeown, Edwards & Lenahan, P.L.L.C.

(57) ABSTRACT

A passenger carrying motor car with a stowage space includes a movable endless belt disposed at a floor of the stowage space. The belt is carried by a rigid supporting member which has a semicircular arc shaped belt guide surface at one end and a belt and driving shaft at the other end. The maximum diameter of the belt during shaft is no greater than the thickness of the supporting member. A second endless belt can be carried by a backrest of a folding seat bordering the stowage space.

24 Claims, 4 Drawing Sheets

PASSENGER-CARRYING OR ESTATE-TYPE MOTOR CAR

This application claims the priority of German Patent Document 199 04 714.6, filed Feb. 5, 1999, the disclosures of which are expressly incorporated by reference herein.

The invention relates to a passenger-carrying or estate-type motor car with a luggage or load space which has a rearward loading aperture and a load-space floor with a load surface which can be displaced by motor in a longitudinal direction of the car, on which load surface luggage or loads can be placed, said load surface being formed by a first endless belt which extends over a width of the load space and rests in a sliding manner on an upper side of a first rigid supporting member, of the same width, and, at one end of the first supporting member, is passed around a first drive shaft which engages in the first endless belt.

In the case of a passenger-carrying or estate-type motor car (station wagons) of the type stated at the outset (German Patent Document DE 197 09 114 A1), the endless belt is guided over a front roller driven by electric motor and over a rear roller. Both rollers are rotatably mounted in a frame. The frame is formed by a solid plate which has respective recesses in the region of the front and rear rollers. The endless belt, which is about 2 mm thick and is composed of rubber, slides directly on the upper side of the plate and is thus supported by the latter, and it runs free underneath the plate, a tensioning roller held on the lower side of the plate keeping the endless belt taut.

In the case of a multi-purpose agricultural vehicle (German Patent Document DD 69 269) with a loading platform, the latter has a self-supporting, flat hollow body which is reinforced by ribs inserted between the upper and lower sides and has bearing locations which are formed at its front and rear ends and are intended for a drive shaft and a direction-change shaft, and also has recesses for chain wheels seated on the shafts and engaging in scraper chains. The two scraper chains, which extend parallel to one another, are connected to one another by transversely aligned scraper bars.

In a known commercial vehicle (German Patent Document DE 34 13 528 A1), a plurality of parallel conveyor belts are driven in the longitudinal direction of the vehicle in the load-space floor by means of chains, a vertical dividing wall moving with the drive chains and conveyor belts. This allows the load to be placed on the conveyor belts at the rearward loading aperture and then to be pushed forwards progressively with the dividing wall. When unloading, the conveyor belts are driven in the opposite direction, with the result that the dividing wall moves progressively in the direction of the loading aperture and the load can be removed from the conveyor belts at the loading aperture. Overall, this facilitates the loading and unloading of the commercial vehicle, which can be performed by means of a fork-lift truck for example. The conveyor belts slide on side frames and inner frames. One end of the conveyor belts is connected to the lower side of the dividing wall, while the other end is connected to a drive chain, and overall the conveyor belt is therefore an endless belt. Engaging in the drive chain are chain wheels of a transmission shaft which is driven by electric motor, with the result that, depending on the direction of rotation of the drive motor, the conveyor belts and the dividing wall are displaced in the direction of the loading aperture (unloading) or away from the latter (loading).

In the case of a likewise known truck (European Patent Document EP 0 173 936 B1), the upper side of the load-space floor including the load surface comprises self-supporting light-alloy extruded sections which, to allow them to be connected in a tension-resistant manner at their longitudinal sides to positively inter-engaging jointed coupling components and, overall, form the load surface with their closely adjacent top surfaces extending in the manner of strips transversely to the conveying direction. In the lower side of the load-surface floor are tension means, e.g. two wire cables, which connect the extruded sections to one another in a tension-resistant manner, giving rise overall to a structure similar to a conveyor belt.

An object on which the invention is based is, in a motor car of the type stated at the outset, to reduce the overall height of the load-space floor with its longitudinally displaceable load surface to an extremely small figure suitable for use in passenger-carrying motor cars or estate-type motor cars and, at the same time, to ensure adequate load-bearing capacity.

According to the invention, the object is achieved by providing an arrangement of the above described general type, wherein the first endless belt is passed around a sliding-contact arc of semicircular cross section formed on an opposite end of the first supporting member and rests in a sliding manner on a lower side of the first supporting member, and wherein an outside diameter of the drive shaft corresponds to a thickness of the first supporting member.

The motor car according to the invention has the advantage that, due to the fact that the endless belt forming the load surface is supported directly and in a sliding manner over its entire width on the upper and lower sides of the supporting member and due to the fact that the endless belt is passed round the rounded end of the supporting member, the supporting member can be configured so as to have a very small overall height, and, in combination with the thickness of the endless belt, this allows a very small overall height of the load-space floor, which can be kept below 30 mm, while the supporting member nevertheless has a high rigidity and load-bearing capacity. Here, the design of the belt drive as a drive shaft which engages directly on the endless belt and has a diameter which does not exceed the thickness of the supporting member creates the conditions for such low-level construction of the load-space floor. The load-space floor with the integrated drive shaft mounted on the supporting member forms a fully preassemblable constructional unit which can be installed quickly and easily in the motor car and furthermore has such a small overall height that it can even be accommodated on the rear side of the backrests of rear seats which can be folded over forwards to enlarge the load space. Overall, the constructional unit can be manufactured and preassembled at low cost.

Advantageous embodiments of the motor car according to the invention, with expedient refinements and developments of the invention, will become apparent from the following description and the claims.

According to an advantageous embodiment of the invention, in the case of a passenger-carrying or estate-type motor car with a rear or back seat having at least one backrest which can be folded over forwards to enlarge the load space and the rear side of which is designed as a load surface and, when folded over, is flush with the load-surface floor, there is accommodated, on the rear side of the at least one backrest, an endless belt of similar configuration which extends over the width of the backrest and is driven in the same way. This has the advantage that, when the load space is enlarged by folding over the backrest, the additional load space created can likewise be loaded conveniently from the loading aperture exposed by the tailgate. In the case of a back seat with a backrest which extends over the width of the car, the endless belt likewise extends over the entire width of the car. In the case of a back seat with a symmetrically or asymmetrically split backrest, each backrest is provided with an independent endless belt having a separate belt drive.

According to an advantageous embodiment of the invention, the endless belt is overlapped with transverse clearance at both longitudinal ends of the supporting member by a longitudinal rail of U-shaped cross section. By means of these overlapping longitudinal rails, the conveyor belt is guided laterally in the conveying direction and the conveyor belt is prevented from sliding off the supporting member.

Other objects, advantages and novel features of the present invention will become apparent from the following detailed description of the invention when considered in conjunction with the accompanying drawings.

DETAILED DESCRIPTION OF THE DRAWINGS

Figure 1:
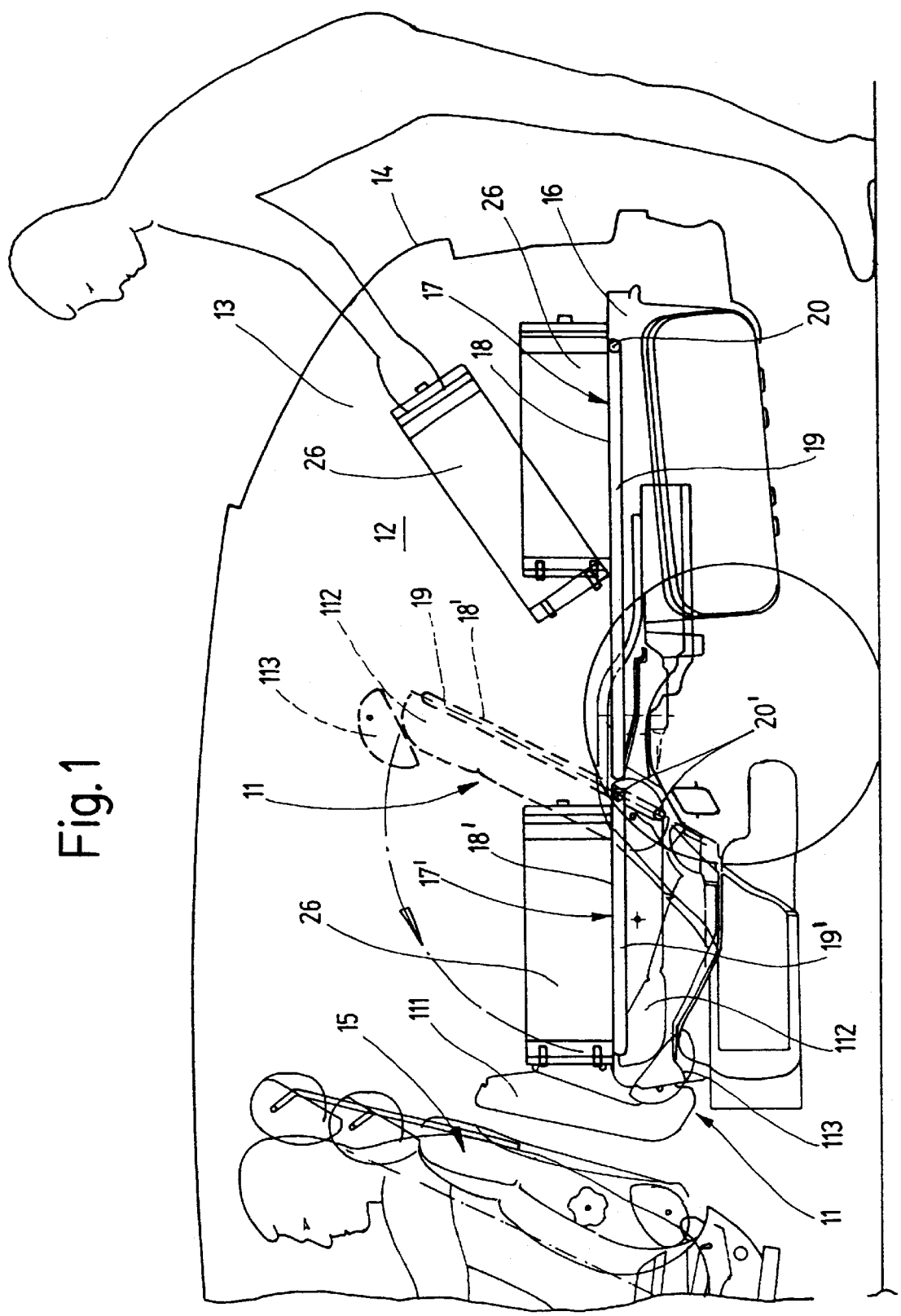
FIG. 1 shows a schematic side view of the rear part of an estate car, constructed according to a preferred embodiment of the present invention.

The estate-type motor vehicle illustrated schematically and in the form of a partial view including its rear area in FIG. 1 and referred to below as an estate car has a luggage or load space 12 which is arranged behind a rear or back seat 11 and can be loaded and unloaded from a rearward loading aperture 13 arranged at the rear. The loading aperture 13 can be closed by means of a tailgate 14 and is exposed by raising the tailgate 14. To enlarge the loading capacity of the load space 12, the seat cushion 111 and the backrest 112 together with the head restraint 113, fixed thereto, of the back seat 11 are held in such a way, in a pivotable or foldable manner, on a seat frame of the back seat 11 that the seat cushion 111 can be pivoted up against the backrest of a front seat 15 and the backrest 112 can be folded forwards by more than 90°, with the result that its rear side is aligned horizontally. The lowered position of the back seat 11 is illustrated in solid lines in FIGS. 1 and 2, while the use position of the back seat 11 is indicated by broken lines.

Figure 3:
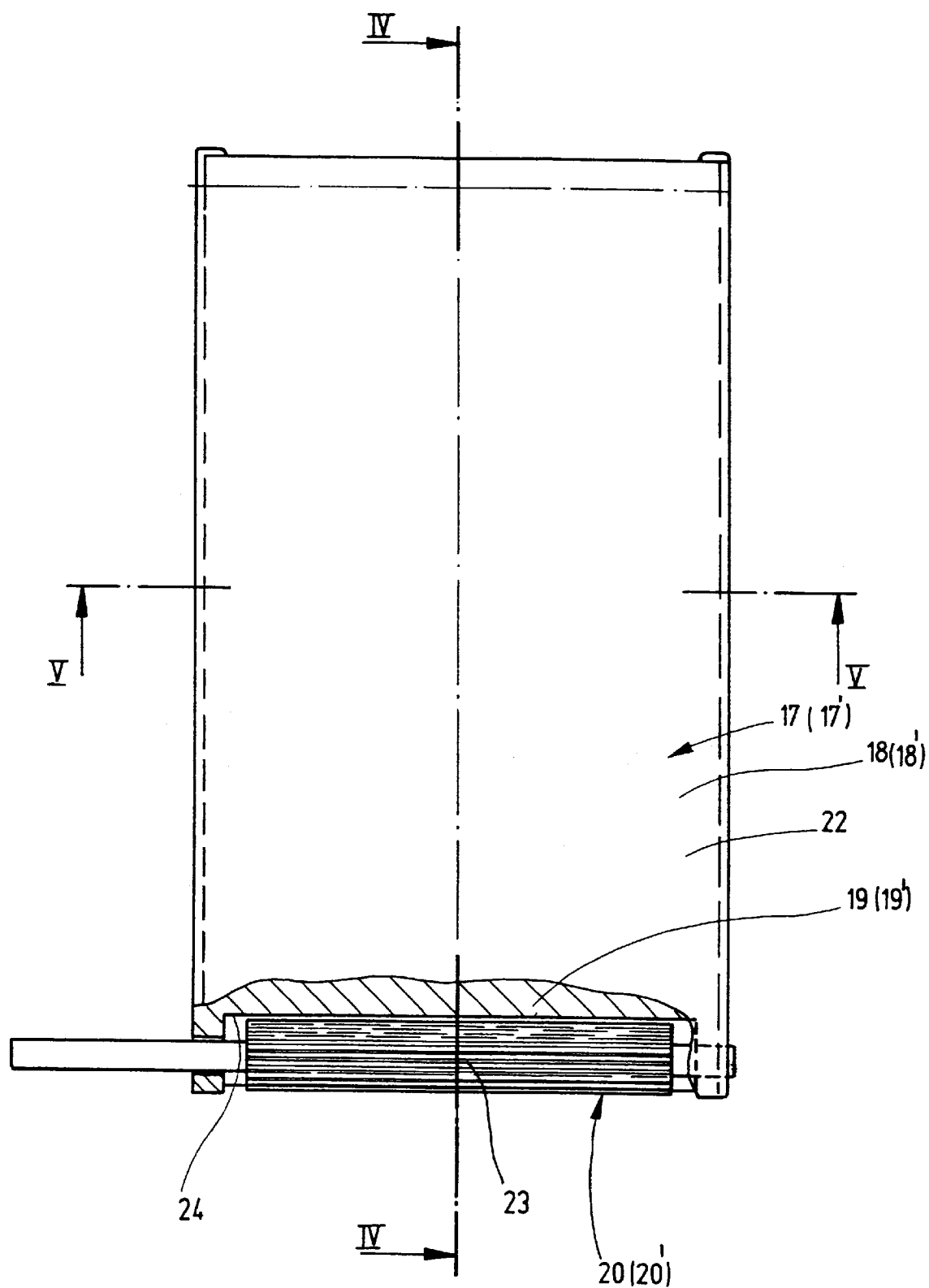
FIG. 3 shows a plan view of the load-space floor in the rear part of the estate car in FIG. 1.
Figure 4:
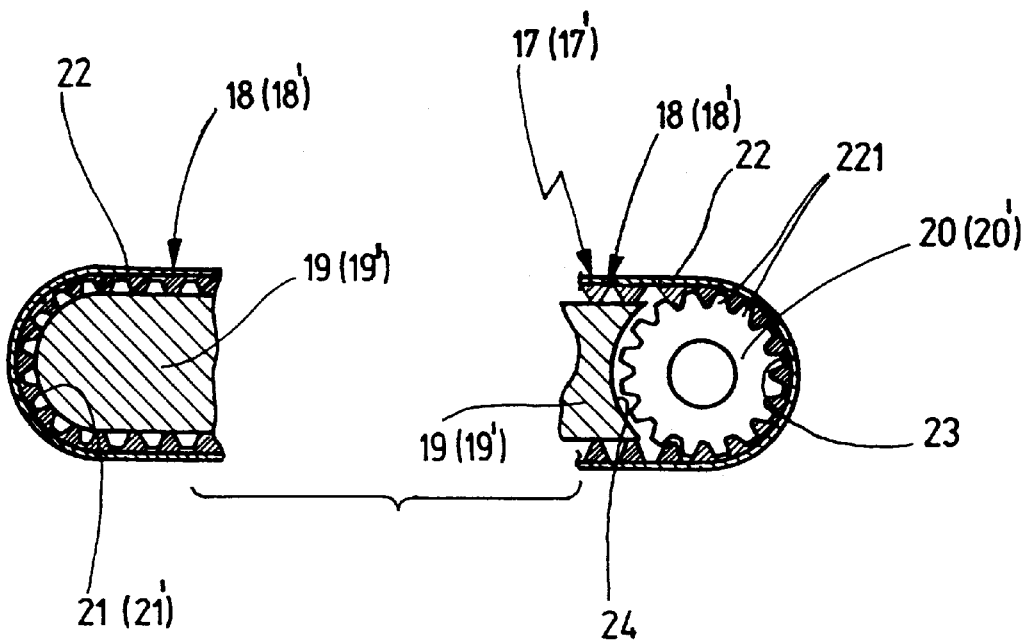
FIG. 4 shows a section along the line IV—IV in FIG. 3.
Figure 5:
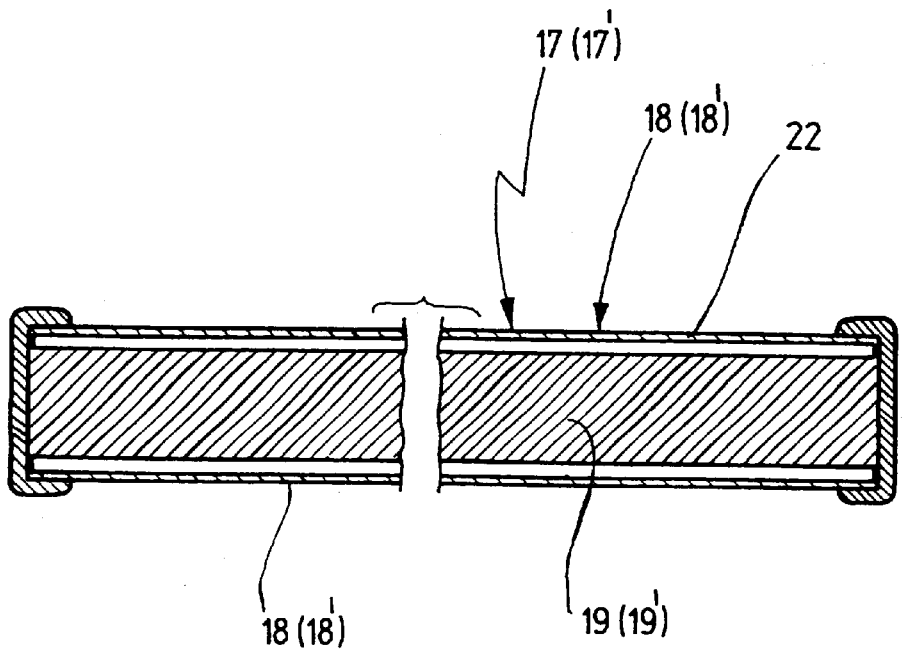
FIG. 5 shows a section along the line V—V in FIG. 3.

The load space 12 is bounded at the bottom, towards the floor of the car, by a load-space floor 16 which has a load surface 17 which can be displaced by motor in the longitudinal direction of the car and on which luggage or loads 26 can be placed. For this purpose, the load surface 17 is formed by an endless belt 18 which extends over the width of the load space, which—as shown, in particular, in FIG. 5—rests in a sliding manner on the upper and lower sides of a rigid supporting member 19 of the same width, and which—as indicated, in particular, in FIGS. 3 and 4—is passed at one end of the supporting member around a drive shaft 20 which engages in the endless belt 18 and is passed at the other end of the supporting member around a sliding-contact arc 21 of semicircular cross section.

At both longitudinal ends of the supporting member 19, the endless belt 18 is overlapped with transverse clearance by a respective longitudinal rail 22 of U-shaped cross section, preventing it from sliding off the supporting member 19 at the side.

In the illustrative embodiment, the endless belt 18 is a toothed belt 22 with belt teeth 221 which point towards the supporting member 19, and the drive shaft 20 has axial toothing 23 corresponding to the belt teeth 221. The drive shaft 20 is rotatably mounted on the supporting member 19 and the outside diameter of the drive shaft 20, more precisely the diameter of the bottom land between the teeth of the axial toothing 23, is equal to the thickness of the supporting member 19, with the result that the endless belt 18 runs in level to the drive shaft 20 from the surface of the supporting member 19.

The supporting member 19 is manufactured from a solid piece of light alloy and has a thickness of less than 30 mm, for example. That end of the supporting member which accommodates the drive shaft 20 has a concave milled recess 24 in the form of a circular arc, the radius of curvature of which is greater by an amount corresponding to a radial gap than the outside radius of the drive shaft 20. The drive shaft 20 is motor-driven, e.g. by an electric motor, or manually driven.

Figure 2:
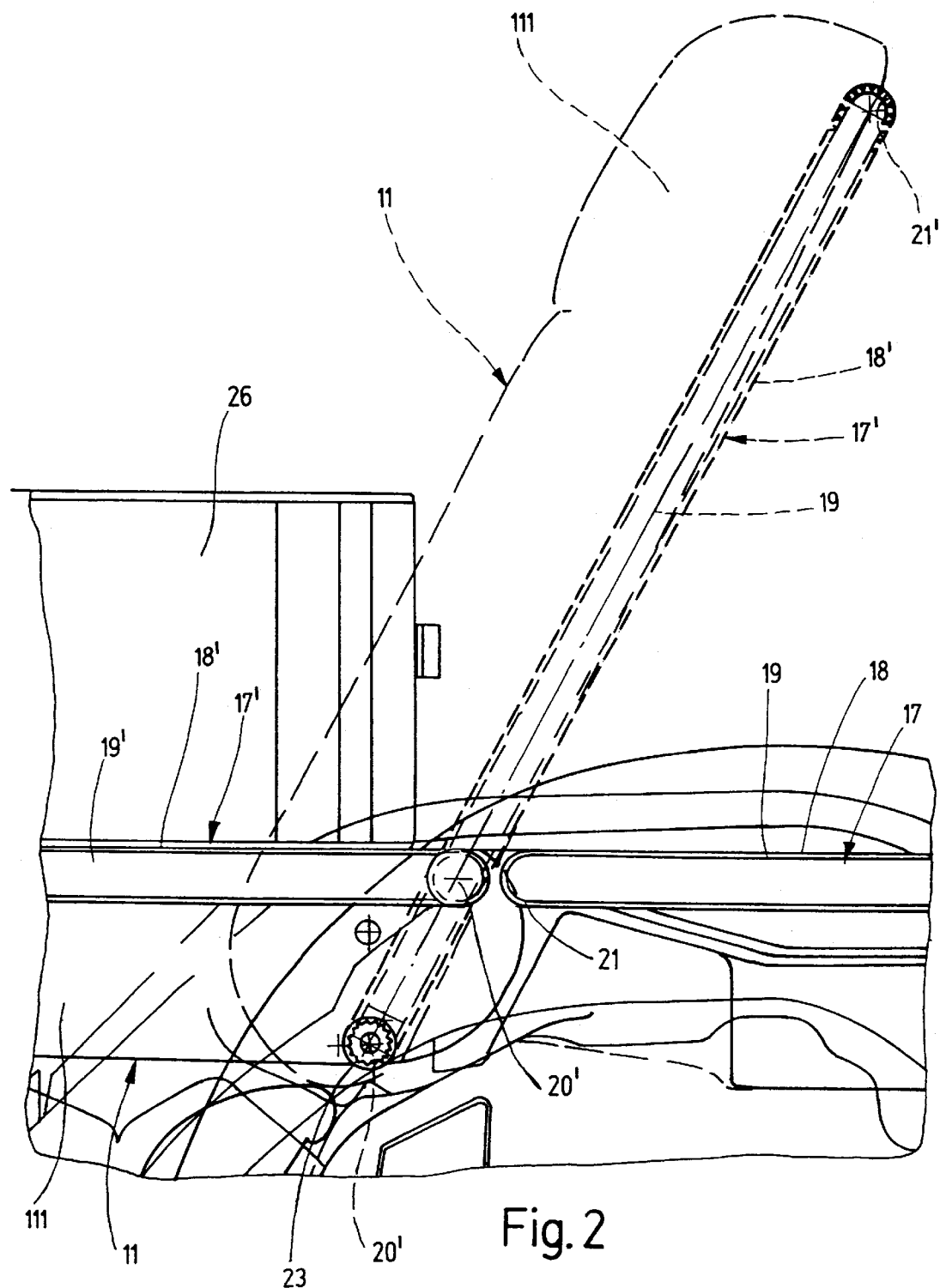
FIG. 2 shows an enlarged detail of the rear part in FIG. 1.

In the case of the folding back seat 11, illustrated in FIGS. 1 and 2, for enlarging the load space 12, an identical endless belt 18' with a supporting member 19' and a drive shaft 20' is integrated into the backrest 112 of the back seat 11 in such a way that one part of the endless belt 18' forms the rear side of the backrest 112. If the backrest 112 is pivoted into its lowered position, illustrated in solid lines in FIGS. 1 and 2, the endless belt 18' lies in the same plane as the endless belt 18 and directly adjoins the latter, so that, with the backrest 112 folded, the load space 12 extends from the tailgate 14 to the front seat 15 and, overall, makes available a two-part load surface 17 and 17' which can be moved in the longitudinal direction of the car and on which a load 26, e.g. a suitcase, is transported from the loading aperture 13 as far as the front seat 15 and vice versa. The drive shaft 20' of the endless belt 18' has its own electric drive. In a simplified embodiment of the estate car, fitting the backrest 112 of the back seat 11 with the endless belt arrangement described can be dispensed with and the endless belt arrangement can be limited to the load space 12 behind the back seat 11.

The invention is not limited to an estate car. It can also be used in passenger-carrying motor cars with a long boot or (trunk) space and a short trunk lid in order to transport loads placed in the trunk space via the trunk aperture to the back of the trunk space and retrieve them from there. The invention can also be used to advantage in load spaces of buses to allow easier access to the load spaces, which are arranged underneath the seating, extend over the entire width of the bus and are accessible from one side of the bus.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Passenger-carrying or estate-type motor car with a luggage or load space which has a rearward loading aperture and a load-space floor with a load surface which can be displaced by motor in a longitudinal direction of the car, on which load surface luggage or loads can be placed, said load surface being formed by a first endless belt which extends over a width of the load space and rests in a sliding manner on an upper side of a first rigid supporting member, of the same width, and, at one end of the first supporting member, is passed around a first drive shaft which engages in the first endless belt, wherein the first endless belt is passed around a sliding-contact arc of semicircular cross section formed on an opposite end of the first supporting member and rests in a sliding manner on a lower side of the first supporting member, and wherein an outside diameter of the drive shaft corresponds to a thickness of the first supporting member.

2. Motor car according to claim 1, wherein a rear seat is provided which has at least one backrest which can be folded over forwards, a rear side of said at least one backrest serving in use as a load surface and, when folded over, is flush with the surface of the load-space floor, wherein the load surface of the at least one backrest is formed by a second endless belt which extends over a width of the backrest, rests in a sliding manner on upper and lower sides of a second supporting member, preferably of the same width, secured in the backrest and which, at one end of the supporting member, is passed around a drive shaft which engages in the second endless belt and has an outside diameter corresponding to a thickness of the second supporting member and, at the other end of the second supporting member, is passed around a sliding-contact arc of semicircular cross section.

3. Motor car according to claim 1, wherein at both longitudinal ends of the first supporting member the first endless belt is overlapped with transverse clearance by a respective longitudinal rail of U-shaped cross section.

4. Motor car according to claim 2, wherein at both longitudinal ends of the second supporting member, the second endless belt is overlapped with transverse clearance by a respective longitudinal rail of U-shaped cross section.

5. Motor car according to claim 2, wherein at both longitudinal ends of both supporting members, both of the respective endless belts are overlapped with transverse clearance by a respective longitudinal rail of U-shaped cross section.

6. Motor car according to claim 1, wherein the first endless belt is a toothed belt with belt teeth which point towards the first supporting member, and wherein the first drive shaft has axial toothing corresponding to the belt teeth.

7. Motor car according to claim 2, wherein the second endless belt is a toothed belt with belt teeth which point towards the second supporting member, and wherein the second drive shaft has axial toothing corresponding to the belt teeth.

8. Motor car according to claim 4, wherein the second endless belt is a toothed belt with belt teeth which point towards the second supporting member, and wherein the second drive shaft has axial toothing corresponding to the belt teeth.

9. Motor car according to claim 5, wherein both endless belts are toothed belts with belt teeth which point towards respective supporting members, and wherein the drive shafts have axial toothing corresponding to the belt teeth.

10. Motor car according to claim 1, wherein the first drive shaft is rotatably mounted on the first supporting member.

11. Motor car according to claim 2, wherein the second drive shaft is rotatably mounted on the second supporting member.

12. Motor car according to claim 5, wherein the second drive shaft is rotatably mounted on the second supporting member.

13. Motor car according to one of claim 1, wherein the thickness of the first supporting member and first belt is less than 30 mm.

14. Motor car according to one of claim 2, wherein the thickness of the second supporting member and second belt is less than 30 mm.

15. Motor car according to one of claim 2, wherein the thickness of both of the respective supporting members and associated belts is less than 30 mm.

16. Motor car according to claim 1, wherein the first supporting member is manufactured from a solid piece of material.

17. Motor car according to claim 16, wherein at that end of the first supporting member which accommodates the first drive shaft, the first supporting member has a concave milled recess, the radius of curvature of which is greater by an amount corresponding to a radial clearance than the outside radius of the first drive shaft.

18. Motor car according to claim 2, wherein the second supporting member is manufactured from a solid piece of material.

19. Motor car according to claim 18, wherein, at that end of the second supporting member which accommodates the second drive shaft, the second supporting member has a concave milled recess, the radius of curvature of which is greater by an amount corresponding to a radial clearance than the outside radius of the second drive shaft.

20. Motor car according to claim 1, wherein the semicircular sliding-contact arc is formed integrally on the first supporting member.

21. Motor car according to claim 2, wherein, the semicircular sliding-contact arc is formed integrally on the second supporting member.

22. A motor vehicle load stowage assembly comprising:

a load space having a loading opening at one end thereof, a load space floor at a bottom of said load space, a rigid supporting member disposable on the floor, and an endless movable belt extending over a width of the supporting member and resting in a sliding manner on top of the supporting member, said endless belt forming a load carrying surface for luggage and other devices to be stowed in the load space, wherein one end of the supporting member includes a semicircular sliding contact arc for the belt and an opposite second end of the supporter member supports a belt drive shaft with an outside diameter corresponding to the thickness of the supporting member.

23. A load stowage assembly according to claim 22, wherein the supporting member and belt extend over a total width of the load space.

24. A load stowage assembly according to claim 22, wherein a foldable seat is disposed at an end of the load space opposite the loading opening, and wherein a second supporting member and endless belt are carried by a back of said seat.

* * * * *